United States Patent [19]
Zhang

[11] Patent Number: 6,141,387
[45] Date of Patent: Oct. 31, 2000

[54] DIGITAL QAM MODULATOR USING POST FILTERING CARRIER RECOMBINATION

[75] Inventor: Qin Zhang, Bensalem, Pa.

[73] Assignees: Motorola, Inc., Schaumburg, Ill.; General Instrument Corporation, Horsham, Pa.

[21] Appl. No.: 09/044,769

[22] Filed: Mar. 19, 1998

[51] Int. Cl.[7] .................................................. H04L 7/02
[52] U.S. Cl. ...................... 375/261; 375/298; 375/277; 375/308; 375/332
[58] Field of Search .................... 375/298, 277, 375/308, 366, 332, 355, 261; 332/103

[56] References Cited

U.S. PATENT DOCUMENTS

| | | | |
|---|---|---|---|
| 5,315,617 | 5/1994 | Guida et al. | 375/261 |
| 5,692,013 | 11/1997 | Koslov et al. | 375/277 |
| 5,781,076 | 7/1998 | Iwamatsu et al. | 332/103 |
| 5,787,133 | 7/1998 | Marchetto et al. | 375/366 |
| 5,825,829 | 10/1998 | Borazjani et al. | 375/308 |

OTHER PUBLICATIONS

H. Samueli/B. Wong, A VLSI Architecture for a High–Speed All–Digital Quadrature Modulator and Demodulator for Digital Radio Applications, IEEE Journal on Selected Areas in Communications, vol. 8, No. 8, 1512–1519 (Oct. 1990).

*Primary Examiner*—Stephen Chin
*Assistant Examiner*—Shuwang Liu
*Attorney, Agent, or Firm*—Volpe and Koenig, P.C.

[57] ABSTRACT

The efficient quadrature amplitude modulator of the present invention allows from 6 to 8 independent compressed channels to occupy a 6 MHz bandwidth while reducing processing power by 33 percent for 8 levels of modulation offered by 64-QAM and by 25 percent for 16 levels of modulation offered by 256-QAM. The modulator achieves this efficiency using an improved digital filter architecture combining the modulation and filtering with post filtering carrier combination. The QAM modulator presented is implemented with a reduction in the total number of binary parallel multipliers. To increase operational throughput, the speed of operation increases with the use of LUTs (look-up tables) storing precomputed filter weighting coefficients. The reduction in multipliers is also achieved by using post filtering carrier combination which similarly reduces the number of MAC operations performed during filtering. The invention can be construction either as a FPGA (field programmable gate array) or an ASIC (application specific integrated circuit).

24 Claims, 9 Drawing Sheets

DIGITAL QAM MODULATOR USING POST FILTERING CARRIER RECOMBINATION

BACKGROUND OF THE INVENTION

1. Field of the Invention

The present invention relates generally to digital quadrature amplitude modulation filtering techniques. More specifically, the invention relates to an efficient quadrature amplitude modulator with a digital filter implementation that significantly decreases required processing power.

2. Description of the Prior Art

In digital communication technology today, one of the more common methods of packing more data bits within an allocated bandwidth is performed using multilevel systems or M-ary techniques. Since digital transmission is notoriously wasteful of RF bandwidth, regulatory authorities usually require a minimum bit packing. One of the more common techniques combining both amplitude and phase modulation is known as M-ary quadrature amplitude modulation (QAM). QAM modulates two different signals into the same bandwidth. This is accomplished by creating a composite amplitude modulated signal using two carriers of the same frequency. The two carriers are distinguished by having a phase difference of 90 degrees. By convention, the cosine carrier is called the in-phase component and the sine carrier is the quadrature component.

A prior art, all digital architecture 15 for a QAM modulator 17 is shown in FIG. 1. The modulator 17 accepts a digital input 19, where it is converted 21 from a serial bitstream to a parallel configuration for input into an encoder 23. The encoder 23 divides the incoming signal into a symbol constellation corresponding to in-phase (I) ($x_r(nT)$) and quadrature (Q) ($jx_i(nT)$) phase components while also performing forward error correction (FEC) for later decoding when the signal is demodulated. The converter outputs are coupled to a QAM modulator 17 comprising identical finite impulse response (FIR) square-root raised Nyquist matched filters 25, 27. The Nyquist filters 25, 27 are a pair of identical interpolating low-pass filters which receive the I ($x_r(nT)$) and Q ($jx_i(nT)$) signals from the encoder 23 and generate real and imaginary parts of the complex band-limited baseband signal. The Nyquist filters 25, 27 ameliorate intersymbol interference (ISI) which is a by-product of the amplitude modulation with limited bandwidth. After filtering, the in-phase ($y_r(nT)$) and quadrature ($jy_i(nT)$) components are modulated with mixers 29, 31 with the IF center frequencies 33, 35 and then summed 37 producing a band limited IF QAM output signal ($g(nT)$) for conversion 39 to analog 41 and transmitted.

A 40-tap matched Nyquist filter would require forty (40) binary multipliers which would consume substantial silicon area and adversely affect the maximum processing speed due to the multiply and accumulate operations (MAC). A multiplier implemented in digital form is inefficient and expensive due to logic gate count. Binary adders are less costly than binary multipliers, however, their use should also be minimized. To implement a design using binary multiplication and addition into an ASIC (application specific integrated circuit) would be expensive to manufacture and result in a more inefficient and slower signal throughput. Likewise, the same applies if programming a FPGA (field programmable gate array). Therefore, one disadvantage of FIR filters is the computational complexity required for each output sample. A QAM modulator constructed according to the teachings of the prior art may require separate integrated circuits rather than total integration onto an economical ASIC or FPGA.

Accordingly, there exists a need for a QAM modulator that increases computational throughput using one filter in conjunction with post filter carrier combination to reduce numeric operations while increasing speed.

SUMMARY OF THE INVENTION

The efficient quadrature amplitude modulator of the present invention allows a plurality of independent, compressed channels to occupy a 6 MHz bandwidth while reducing processing power by 33 20 percent for 8 levels of modulation offered by 64-QAM and by 25 percent for 16 levels of modulation offered by 256-QAM. The modulator achieves this efficiency using an improved digital filter architecture combining the modulation and filtering with post filtering carrier combination.

The QAM modulator presented is implemented with a reduction in the total number of binary parallel multipliers. To increase operational throughput, the speed of operation increases with the use of LUTs (look-up tables) storing precomputed filter weighting coefficients. The reduction in multipliers is also achieved by using post filtering carrier combination which similarly reduces the number of MAC operations performed during filtering. The invention can be construction either as a FPGA or an ASIC. The use of LUTs save significant chip resources and manufacturing cost.

Accordingly, the object of the present invention is to provide an efficient QAM modulator for multichannel applications.

It is a further object of the invention to provide a multichannel QAM architecture of reduced complexity and increased performance.

Other objects and advantages of this system will become apparent to those skilled in the art after reading the detailed description of the preferred embodiment.

DESCRIPTION OF THE PREFERRED EMBODIMENTS

Figure 1:
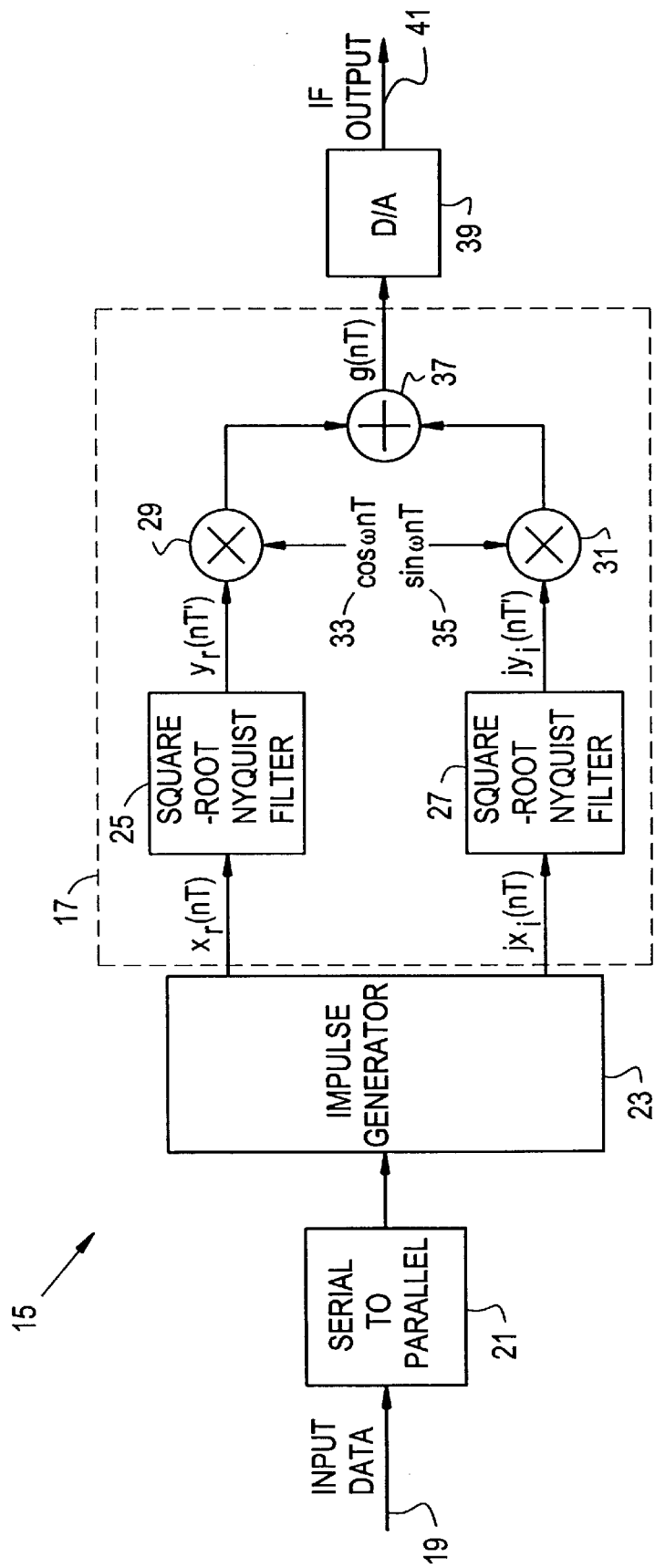
FIG. 1 is a system block diagram of a typical, prior art, quadrature amplitude modulator.

A quadrature amplitude modulator is described with reference to the drawing figures where like numerals will represent like elements throughout. Such modulators are used in multichannel CATV communication headends in conjunction with the transmission of a plurality of consumer programming.

Figure 2:
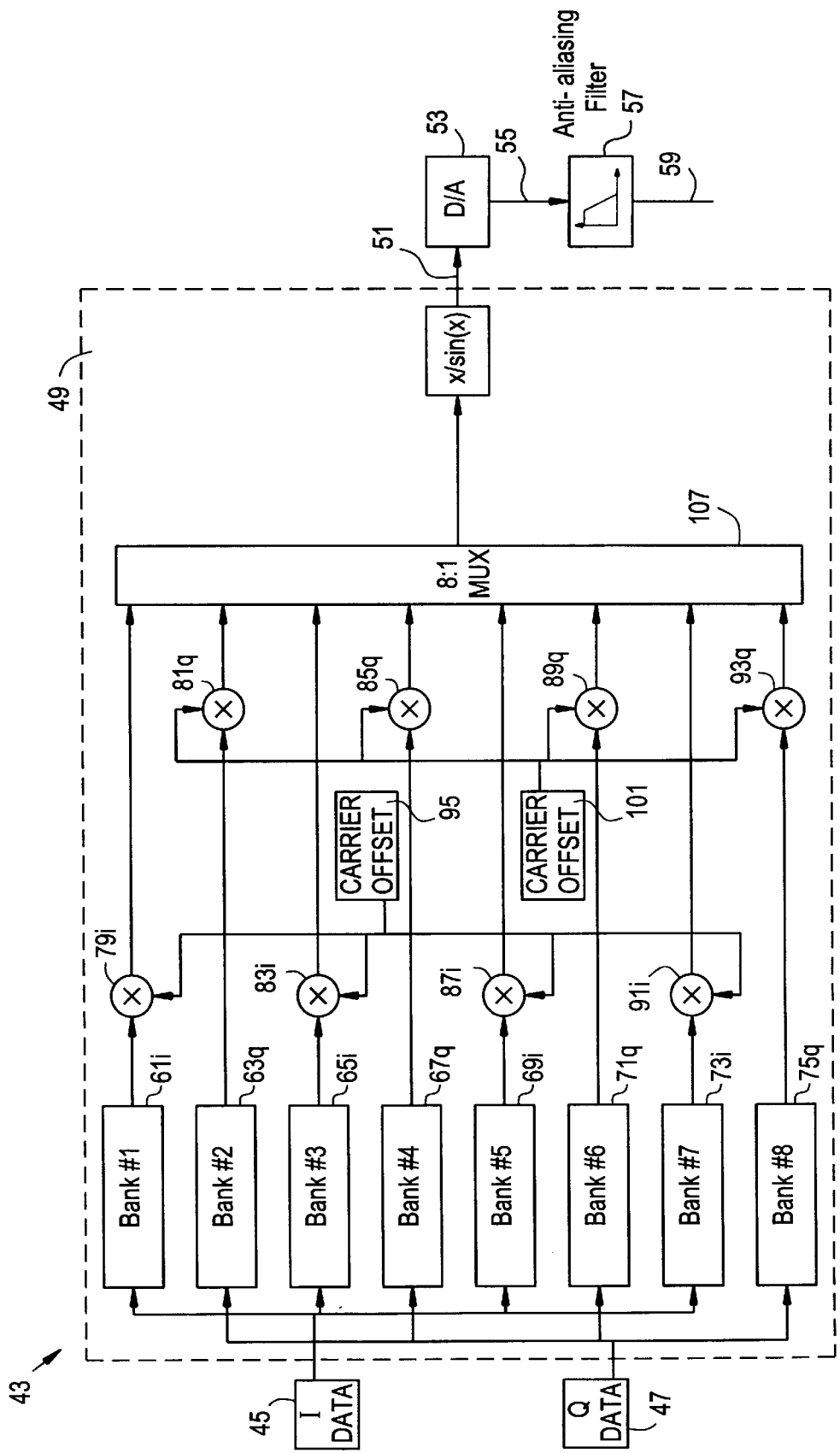
FIG. 2 is a system block diagram of the present invention.

A system block diagram of the present invention 43 is shown in FIG. 2. A forward error correction (FEC) encoder produces in-phase (I) 45 and quadrature-phase (Q) 47 data streams for the digital QAM modulator 49 in accordance with a predetermined QAM constellation. The QAM modulator 49 performs Nyquist baseband filtering, digital interpolation and quadrature amplitude modulation. The output of the QAM modulator is a digital intermediate frequency signal. A digital to analog (D/A) converter 53 transforms the digital IF signal to analog 55 for transmission.

To simplify the digital signal processing performed in a FIR filter and facilitate programming a FPGA, post filtering carrier recombination is used to reduce the overall digital filter complexity and to eliminate additional high frequency clock sources. Unlike prior art FIR filters that rely upon many MAC operations, serial multipliers are used in the mixers of the present invention to exploit the high processing speed of the FPGA chip without the overhead of multiplexers used when parallel multiplying. The economy of using shift register and half-adders to perform multiplication is well understood in this art.

By way of background, for 256-QAM, the I and Q input data each are comprised of 4 bits. 4 bits of data can represent multilevel (16) Return to Zero (RZ) signals with a discrete 0 level and levels 1 through 15. However, when transmitting radio frequencies, a symmetrical waveform is desired for the best signal-to-noise ratio (SNR) with a given transmitter power. With a 4-bit, 16 modulation level waveform, one cannot construct a symmetrical non-return to zero (NRZ) signal since there are only two possible level assignments: −7 through +8 or −8 through +7 from the four bits totaling an even sixteen.

Level 0 located on the abscissa does not require carrier transmission. If either of the above two groups of waveforms are used to generate the RF signal, they will create two problems. First, the output RF signal level will not have a uniform distribution even though the input data probability for each level had a uniform distribution thereby reducing overall channel efficiency. Second, the zero level data will generate zero carrier output. For a prolonged period of zero level signaling, a receiver may lose the synchronization of the incoming signal. Frequency re- synchronization would make the system inoperable.

To obtain a symmetrical multilevel NRZ signal, one offset bit must be added to the original sampled data. The 4-bit information can then be expressed by discrete levels 15 through −15. These levels can be represented by a 4 to 5-bit mapping where only the values of −15, −13, . . . −1, 1, . . . 13, 15 are used. For digital signal processing, one extra bit represents a 25% increase in the input data rate for 256-QAM. For 64-QAM, the extra bit represents a 33% increase in input data rate.

One cost consideration for a digital modulator is determined by the digital filter complexity necessary to process an input data rate. A 33% increase in the net input data rate results in a significant cost increase in hardware for the digital filter and the clock source.

The present invention efficiently implements a Nyquist filter using serial multipliers and look-up tables for the weighting coefficients to perform the digital signal processing. Serial multipliers require a N times (Nx) clock source for the multipliers (mixers), where N is the number of bits of the input data. As an example, for 256-QAM, without post filtering carrier recombination, a serial multiplier requires a 5× clock source. This requires an extra phase-locked loop (PLL) with a voltage controlled oscillator (VCO), a phase comparator and a loop filter. In the present invention, using post filtering carrier recombination, only the original 4 bits of signal data are processed during filtering. With 4 bits of input data, the serial multipliers require a 4× clock which is readily available from the input data or can be easily derived from the harmonics of the input data without the PLL circuitry.

To show the commutative property of adding the carrier offset after filtering, a NRZ signal g(n) can be characterized as $$g(n)=f(n)+c(n), \qquad \text{Eqn. 1}$$

where f(n) represents a multilevel RZ signal of the input I and Q data bitstreams with discrete levels −7 to +8, and c(n) is one offset bit, a constant of −0.5 is achieved by mapping 4 bits to 5. The output of the Nyquist filter is $$e(n)=g(n)*h(n), \qquad \text{Eqn. 2}$$
$$=f(n)*h(n)+c(n)*h(n); \qquad \text{Eqn. 3}$$

where * denotes the convolution operator, A(n) is the Nyquist low-pass filter, and e(n) is the filter output.

Using a 1:8 (eight times) interpolation ratio and a 320-tap Nyquist filter as in the preferred embodiment, the 320-tap filter can be reduced to eight 40-tap filters using a carrier frequency equal to one quarter (T/4) of the sampling frequency. Substituting, the above equation results in $$e(8 \cdot i - j) = \sum_{n=0}^{40} g(i-n)*h(8 \cdot n - j) + \qquad \text{Eqn. 4}$$
$$\sum_{n=0}^{40} c(i-n)*h(8 \cdot n - j),$$

$$= \sum_{n=0}^{40} g(i-n)*h(8 \cdot n - j) - \qquad \text{Eqn. 5}$$
$$0.5\sum_{n=0}^{40} h(8 \cdot n - j);$$

where g(n) is the I and Q input data before interpolation and j=1,2,3 . . . 8, represents each subfilter. Equation 4 shows that the Nyquist filtering, interpolation and modulation for each I and Q bitstream can be divided into eight I and Q sub-filter banks as shown in FIGS. 3A and 3B respectively.

Figure 3A:
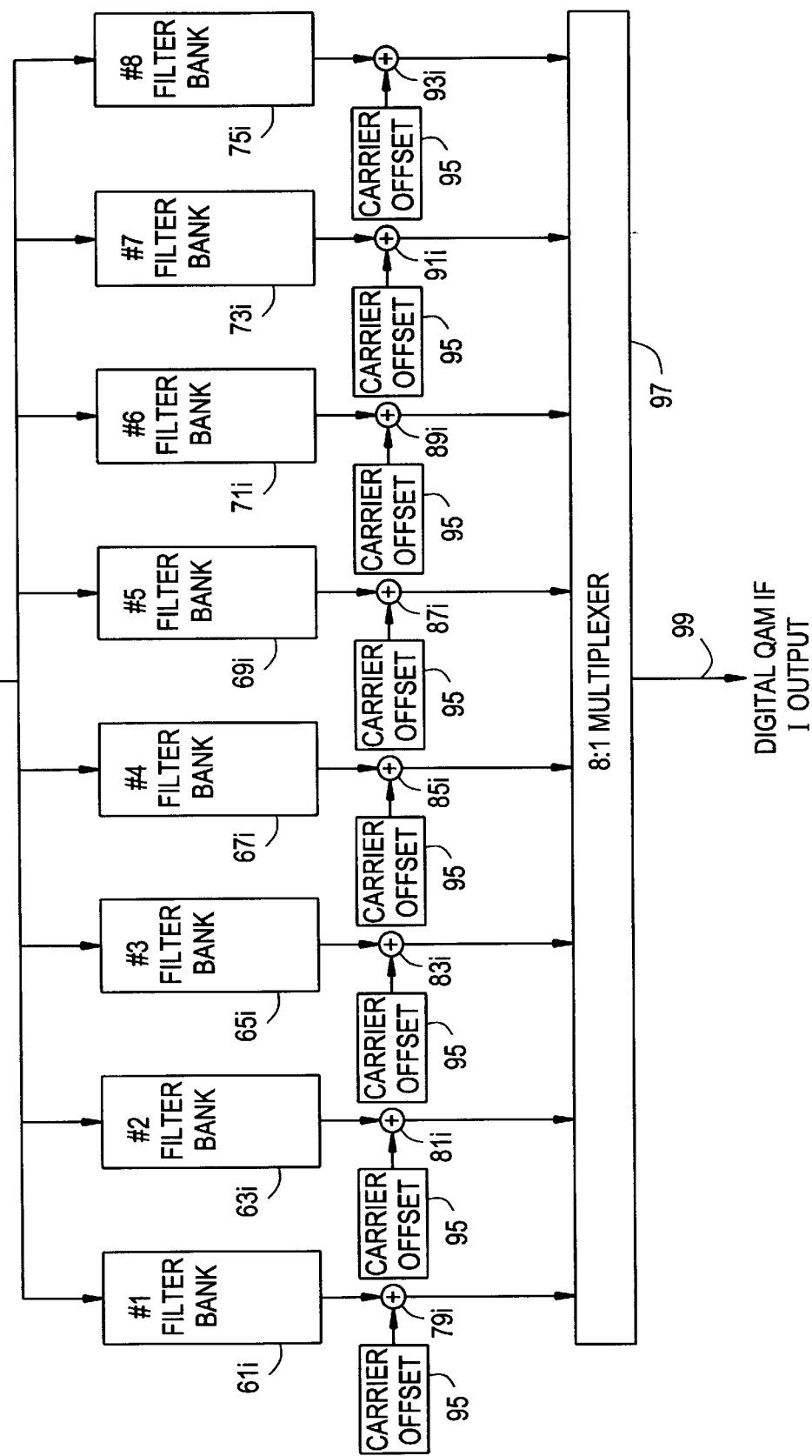
FIG. 3A is a system block diagram of the Nyquist filter architecture for the in-phase component.
Figure 3B:
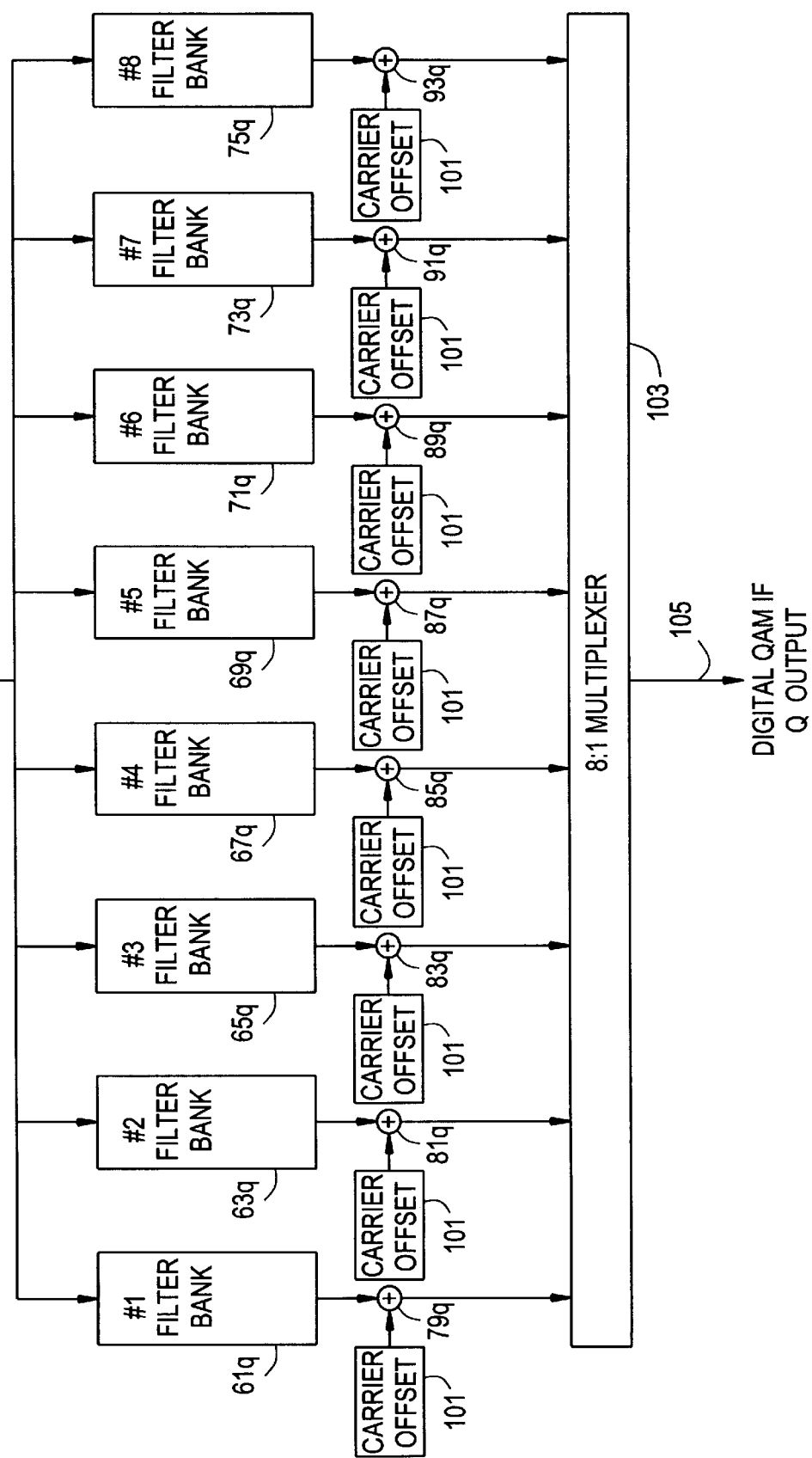
FIG. 3B is a system block diagram of the Nyquist filter architecture for the quadrature component.

FIG. 3A shows the in-phase (I) Nyquist filter for the modulator 43 incorporating post filtering carrier combination. As derived above, the 320-tap Nyquist filter is reduced to 8 discrete filter banks 61*i*, 63*i*, 65*i*, 67*i*, 69*i*, 71*i*, 73*i*, 75*i*, 40-taps each. The output of each filter bank is mixed 79*i*, 81*i*, 83*i*, 85*i*, 87*i*, 89*i*, 91*i*, 93*i* with the cosine carrier offset 95 and multiplexed 96 and outputting with the carrier offset phase. FIG. 3B shows the same reduction in the Nyquist filter for the quadrature (Q) phase data. Eight 40-tap Nyquist filters 61*q*, 63*q*, 65*q*, 67*q*, 69*q*, 71*q*, 73*q*, 75*q*. The output of each filter bank is mixed 79*q*, 81*q*, 83*q*, 85*q*, 87*q*, 89*q*, 91*q*, 93*q* with the sine carrier offset 101 and multiplexed 103 and output 104 with the carrier offset phase.

Figure 3C:
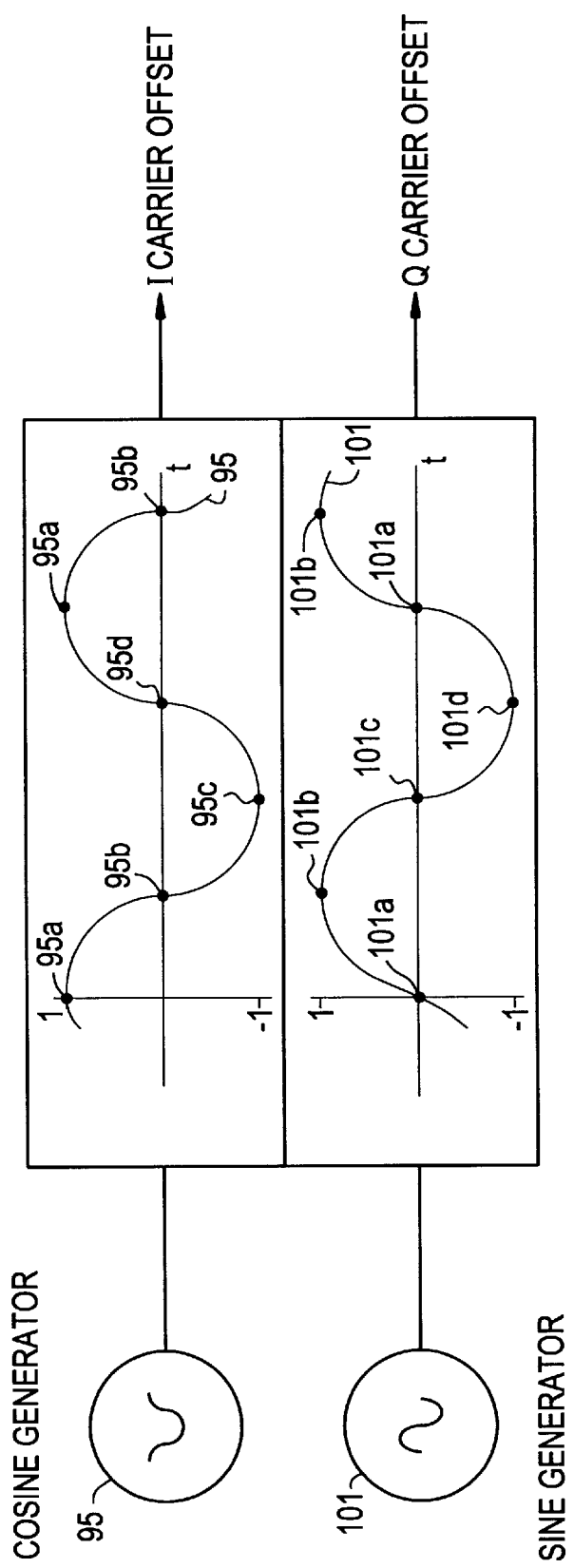
FIG. 3C is a block diagram of the mixing function showing the sine cosine waveforms.

With the IF center frequency of the QAM modulator equaling the symbol rate 1/T, the cosine 95 and sine 101 waveforms shown in FIG. 3C required for the mixing function can likewise be sampled at each quarter of 360 degrees, or at 0, 90, 180 and 270 degrees. The corresponding values therefore equal 1 (95*a*), 0 (95*b*), −1 (95*c*), 0 (95*d*) for the cosine 95 and 0 (101*a*), 1 (101*b*), 0 (101*c*) −1 (101*d*) for the sine 101 waveforms. As can be seen, when either waveform has a 0 magnitude, the other waveform has a value of 1 or −1. Since half of the cosine 95 and sine 101 samples are 0, when sampled at 4/T, the two identical 320-tap FIR filters as shown in FIGS. 3A and 3B for the I and Q bitstreams can be replaced with one 320-tap FIR filter which simultaneously processes both the I and Q bitstreams as shown in FIG. 2, sampling each I and Q bitstream at a rate of 2/T rather than 4/T, eliminating the zero magnitude value. With a 1:8 interpolation ratio, the 320-tap FIR filter processes the I and Q bitstreams in parallel, clocked at a rate equal to the symbol rate 1/T.

A detailed data flow for one 40-tap subfilter is shown in FIG. 6. Both the I and Q input data bitstreams (only one shown) are transformed from 4-bit parallel to 4-bit serial word strings using a shift clock 109 and registers 111. The 4-bit serial data is partitioned and stored in RAM based shift registers for all 160 -tap values. As previously described, the incoming bitstreams for in-phase and quadrature data are divided into groups 113 of 40-tap values corresponding to their 4 subfilters respectively. The data is further divided into groups of four 115 corresponding to 4×4 Look-Up Tables (LUTs) and are shifted out as a 4-bit magnitude.

The look-up tables function as follows. A mathematical function $f$ of an argument x with a result of y is expressed as $y=f(x)$. The function performs a mapping of all values of x into another space of y values. A LUT performs this mapping for the values of interest in the preferred embodiment. The LUT memory device is presented with an address of a location within the memory circuit. The value previously stored at that location is delivered to the memory output data bus. The values of interest of x, which are discrete, are mapped into a binary number. Since the signals are represented by zero or one logic levels, they are used as bits to form a binary number. Every possible combination of values is assigned a state number. This operation is represented as $$A = \sum_{j=0}^{M-1} x_j 2^j = x_{M-1} 2^{M-1} + \ldots x_3 2^3 + x_2 2^2 + x_1 2^1 + x_0 2^0 \quad \text{Eqn. 7}$$

$$= x_{M-1} 2^{M-1} + \ldots x_3 8 + x_2 4 + x_1 2 + x_0. \quad \text{Eqn. 8}$$

Each state is a binary number that references an address in the LUT. The output value from the LUT is the precomputed value of the function resultant that would occur given the argument corresponding to that address. This is illustrated as a tabular representation of the LUT contents. The function to be performed is the weighted sum of the multiple channels for a given single tap of the FIR structure.

For example, in an application using 4 bits (M=4), the LUT contents located at the 2nd tap (j=2) would be as shown in Table 1.

TABLE 1

| Values of x $x_3, x_2, x_1, x_0$ | Address Computation of A | LUT Value Stored At Location A |
|---|---|---|
| 0 0 0 0 | 0 | 0 |
| 0 0 0 1 | 1 = 1 | $w_0 c_2$ |
| 0 0 1 0 | 2 = 2 | $w_1 c_2$ |
| 0 0 1 1 | 2 + 1 = 3 | $w_1 c_2 + w_0 c_2$ |
| 0 1 0 0 | 4 = 4 | $w_2 c_2$ |
| 0 1 0 1 | 4 + 1 = 5 | $w_2 c_2 + w_0 c_2$ |
| . . . | . . . | . . . |
| . . . | . . . | . . . |
| . . . | . . . | . . . |
| . . . | . . . | . . . |

TABLE 1-continued

| Values of x $x_3, x_2, x_1, x_0$ | Address Computation of A | LUT Value Stored At Location A |
|---|---|---|
| . . . | . . . | . . . |
| 1 1 0 1 | 8 + 4 + 1 = 13 | $w_3 c_2 + w_2 c_2 + w_0 c_2$ |
| 1 1 1 0 | 8 + 4 + 2 = 14 | $w_3 c_2 + w_2 c_2 + w_1 c_2$ |
| 1 1 1 1 | 8 + 4 + 2 + 1 = 15 | $w_3 c_2 + w_2 c_2 + w_1 c_2 + w_0 c_2$ |

The LUT 56 memory words contain precomputed values corresponding to the current input address value as shown in FIG. 8B. The memory can be implemented in either ROM or RAM, depending upon the application.

In the preferred embodiment, ROM (read only memory) is used to store permanent LUT values. This is implemented efficiently as an integrated circuit. ROM is appropriate for time invariant systems where the required channel weights and filter coefficients are known a priori. RAM (random access memory) allows new values to be written over old. LUT values can be computed and loaded to achieve adaptivity. RAM is not as space efficient as ROM but is still efficient considering the increased flexibility. For 25-QAM, 80 LUTs are required. The output from each LUT is serially multiplied with the outputs from the other LUTs belonging to a subfilter. The product is modulated with the carrier producing a NRZ modulated IF signal.

The output of each subfilter is input to a mixer which is mixed with the respective carrier offset. The output of each mixer is input to a 8:1 ratio multiplexer 107. The output of the mixer is coupled to a sinc function 109, X/sine (x) which compensates for amplitude distortion introduced during digital to analog conversion. The output of the sinc function is input to a digital to analog converter 53 for conversion to analog and filtered 57 to prevent aliasing. The output 59 is transmitted.

The first term in Equation 4 is the digital filtering and modulation of the RZ input data. The second term is a constant for each filter bank. The offset carrier will match the filter data carrier as long as the offset for each filter bank output is equal to the summation of $$-0.5 \sum_{n=0}^{40} h(8 \cdot n - j) \quad \text{Eqn. 6}$$

j=1,2,3 . . . , 8 for each corresponding subfilter.

It has been shown that recombining the carrier component for each I and Q data bitstream after digital filtering, the input data RZ to NRZ transform process before filtering has been eliminated. The filtering and modulation process is simplified since the digital processor performing the filtering operation requires an operand for only 4 bits of data for 256-QAM modulation and 3 bits of data for 64-QAM modulation.

Figure 4:
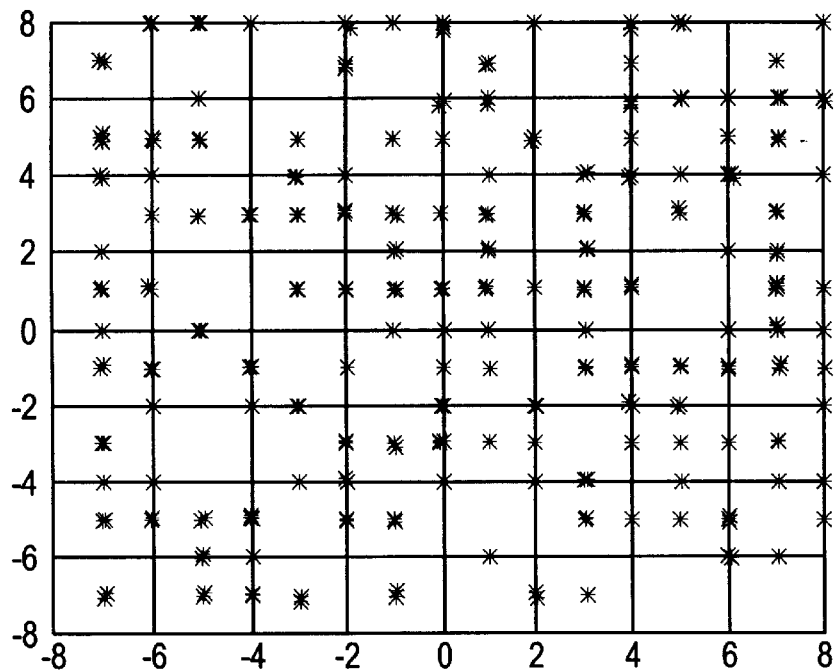
FIG. 4 is a plot of the return to zero signal input constellation.
Figure 5:
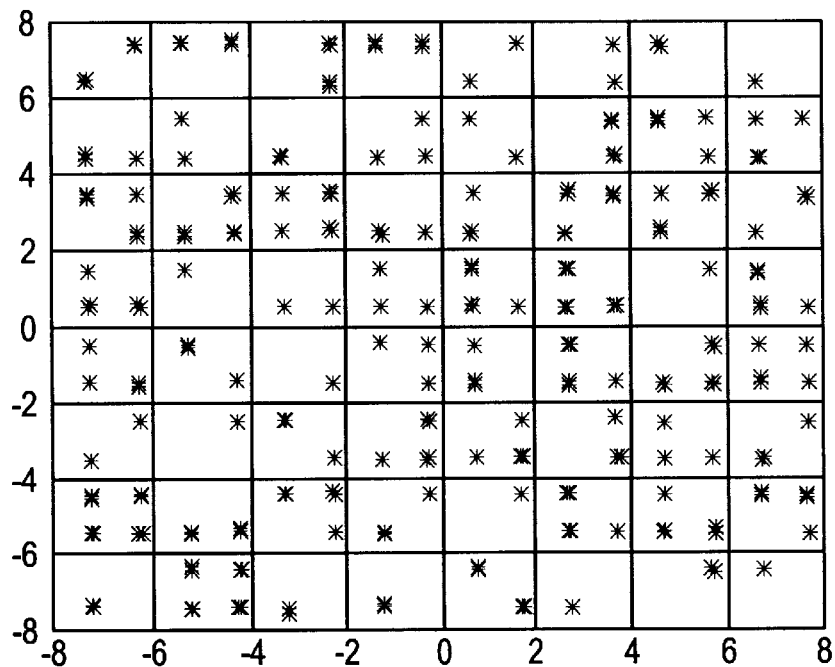
FIG. 5 is a plot of the non-return to zero signal output constellation after carrier combination.

A constellation diagram for 256-QAM using a RZ signal input (without the 1 bit carrier offset) is plotted in FIG. 4. The carrier corrected output signal constellation is plotted in FIG. 5. The present invention combines the filtered output of the Nyquist filter with an offset carrier. The final signal is a NRZ modulated IF signal with an accurate carrier offset.

Figure 7:
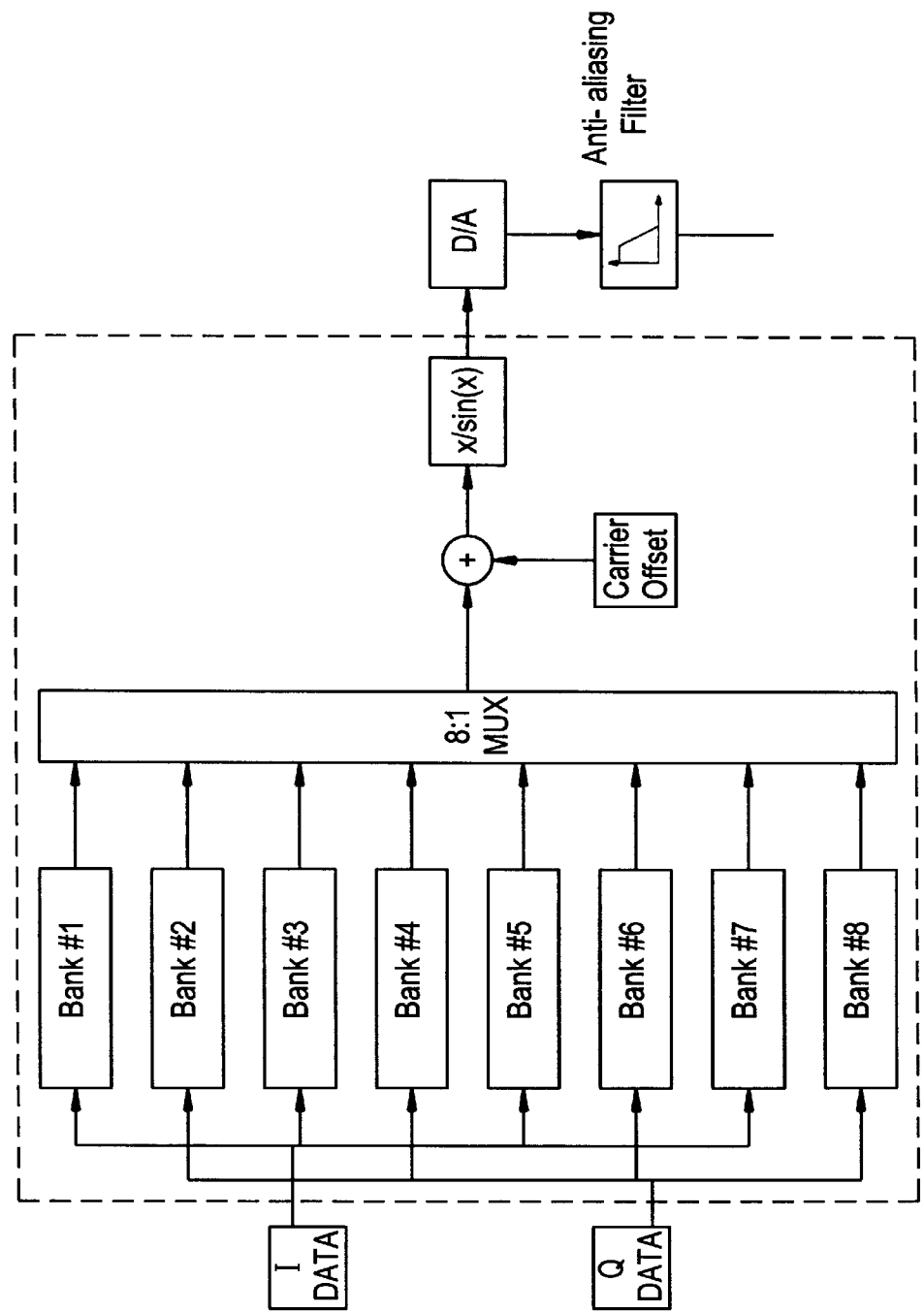
FIG. 7 is a system block diagram of an alternative embodiment of the present invention.

An alternative embodiment of the present invention is shown in FIG. 7. The distinction between the preferred and alternative embodiments is the location where the post filtering carrier combination is executed. In the alternative embodiment, the carrier offset is mixed downstream of the 8:1 multiplexer. This embodiment reduces the number of post filtering mixers and the elimination of two oscillators requiring a more complex arrangement where the carrier offset is switching between the cosine and sine function in dependence upon when the multiplexer selects a corresponding in-phase or quadrature phase subfilter. The alternative embodiment presents a more elegant approach with added switching complexity.

While the present invention has been described in terms of the preferred embodiment, other variations which are within the scope of the invention as outlined in the claims below will be apparent to those skilled in the art.

I claim:

1. A digital quadrature amplitude modulator (QAM) comprising:
    a first QAM input for receiving in-phase data bitstreams from a forward error correcting (FEC) encoder;
    a second QAM input for receiving quadrature phase data bitstreams from said FEC encoder;
    a QAM output;
    a plurality of first subfilters, each having an input coupled to said first QAM input and an output coupled to an individual input of a multiplexer;
    a plurality of second subfilters equal in number to said plurality of first subfilters;
    each second subfilter having an input coupled to said second QAM input and an output coupled to an individual input of said multiplexer;
    first modulating means providing post filter carrier offset coupled to said first subfilter outputs;
    second modulating means providing post filter carrier offset coupled to said second subfilter outputs;
    said multiplexer inputs arranged in a series such that the coupling of successive multiplexer inputs alternate between a coupling with a first subfilter output and a coupling with a second subfilter output; and
    said multiplexer having an output coupled to said QAM output.

2. The digital QAM according to claim 1 wherein said first modulating means further comprises:
    a plurality of mixers corresponding to each of said first subfilters, each mixer having a first and second input and an output; and
    a plurality of cosine generators corresponding to said number of said first subfilters, each having an output coupled to said respective mixers of said first subfilters;
    said second modulating means further comprises:
    a plurality of mixers corresponding to each of said second subfilters, each mixer having a first and second input and an output; and
    a plurality of sine generators corresponding to said number of said second subfilters, each having an output coupled to said respective mixers of said second subfilters.

3. The digital QAM according to claim 1 wherein each subfilter is a look-up table.

4. The digital QAM according to claim 1 wherein the in-phase and quadrature phase data bitstreams represent a 64-QAM constellation.

5. The digital QAM according to claim 1 wherein the in-phase and quadrature phase data bitstreams represent a 256-QAM constellation.

6. A digital quadrature amplitude modulator (QAM) comprising:
    a first QAM input for receiving in-phase data bitstreams from a forward error correcting (FEC) encoder;
    a second QAM input for receiving quadrature phase data bitstreams from said FEC encoder;
    a QAM output;
    a plurality of first subfilters, each having an input coupled to said first QAM input and an output coupled to an individual input of a multiplexer;
    a plurality of second subfilters equal in number to said plurality of first subfilters;
    each second subfilter having an input coupled to said second QAM input and an output coupled to an individual input of said multiplexer;
    said multiplexer inputs arranged in a series such that the coupling of successive multiplexer inputs alternate between a coupling with a first subfilter output and a coupling with a second subfilter output and said multiplexer having an output; and
    modulating means providing post filter carrier offset for all said data bit streams.

7. The digital QAM according to claim 6 wherein said modulating means is coupled to said multiplexer output and further comprises:
    a mixer having a first and second input and an output; and
    a signal generator having an output coupled to said mixer wherein said signal generator switches between a cosine and a sine function in dependence upon whether said multiplexer selects a corresponding in-phase or quadrature phase subfilter.

8. The digital QAM according to claim 6 wherein each subfilter is a look-up table.

9. The digital QAM according to claim 6 wherein the in-phase and quadrature phase data bitstreams represent a 64-QAM constellation.

10. The digital QAM according to claim 6 wherein the in-phase and quadrature phase data bitstreams represent a 256-QAM constellation.

11. The digital QAM according to claim 6 wherein said modulating means further comprises:
    first modulating means providing post filter carrier offset coupled to said first subfilter outputs; and
    second modulating means providing post filter carrier offset coupled to said second subfilter outputs.

12. The digital QAM according to claim 11 wherein said first modulating means further comprises:
    a plurality of mixers corresponding to each of said first subfilters, each mixer having a first and second input and an output; and
    a plurality of cosine generators corresponding to said number of said first subfilters, each having an output coupled to said respective mixers of said first subfilters;
    said second modulating means further comprises:
    a plurality of mixers corresponding to each of said second subfilters, each mixer having a first and second input and an output; and
    a plurality of sine generators corresponding to said number of said second subfilters, each having an output coupled to said respective mixers of said second subfilters.

13. A CATV digital quadrature amplitude modulator (QAM) located at a CATV system headend comprising:
    a first QAM input for receiving in-phase data bitstreams from a forward error correcting (FEC) encoder;
    a second QAM input for receiving quadrature phase data bitstreams from said FEC encoder;
    a QAM output;

a plurality of first subfilters, each having an input coupled to said first QAM input and an output coupled to an individual input of a multiplexer;

a plurality of second subfilters equal in number to said plurality of first subfilters;

each second subfilter having an input coupled to said second QAM input and an output coupled to an individual input of said multiplexer;

first modulating means providing post filter carrier offset coupled to said first subfilter outputs;

second modulating means providing post filter carrier offset coupled to said second subfilter outputs;

said multiplexer inputs arranged in a series such that the coupling of successive multiplexer inputs alternate between a coupling with a first subfilter output and a coupling with a second subfilter output; and said multiplexer having an output coupled to said QAM output.

14. The digital QAM according to claim 13 wherein said first modulating means further comprises:

a plurality of mixers corresponding to each of said first subfilters, each mixer having a first and second input and an output; and a plurality of cosine generators corresponding to said number of said first subfilters, each having an output coupled to said respective mixers of said first subfilters;

said second modulating means further comprises:

a plurality of mixers corresponding to each of said second subfilters, each mixer having a first and second input and an output; and a plurality of sine generators corresponding to said number of said second subfilters, each having an output coupled to said respective mixers of said second subfilters.

15. The CATV digital QAM according to claim 13 wherein each subfilter is a look-up table.

16. The CATV digital QAM according to claim 13 wherein the in-phase and quadrature phase data bitstreams represent a 64-QAM constellation.

17. The CATV digital QAM according to claim 13 wherein the in-phase and quadrature phase data bitstreams represent a 256-QAM constellation.

18. A CATV digital quadrature amplitude modulator (QAM) comprising:

a first QAM input for receiving in-phase data bitstreams from a forward error correcting (FEC) encoder;

a second QAM input for receiving quadrature phase data bitstreams from said FEC encoder;

a QAM output;

a plurality of first subfilters, each having an input coupled to said first QAM input and an output coupled to an individual input of a multiplexer;

a plurality of second subfilters equal in number to said plurality of first subfilters;

each second subfilter having an input coupled to said second QAM input and an output coupled to an individual input of said multiplexer;

said multiplexer inputs arranged in a series such that the coupling of successive multiplexer inputs alternate between a coupling with a first subfilter output and a coupling with a second subfilter output and said multiplexer having an output; and modulating means providing post filter carrier offset for all said data bit streams.

19. The CATV digital QAM according to claim 18 wherein said modulating means is coupled to said multiplexer output and further comprises:

a mixer having a first and second input and an output; and a signal generator having an output coupled to said mixer wherein said signal generator switches between a cosine and a sine function in dependence upon whether said multiplexer selects a corresponding in-phase or quadrature phase subfilter.

20. The CATV digital QAM according to claim 18 wherein each subfilter is a look-up table.

21. The CATV digital QAM according to claim 18 wherein the in-phase and quadrature phase data bitstreams represent a 64-QAM constellation.

22. The CATV digital QAM according to claim 18 wherein the in-phase and quadrature phase data bitstreams represent a 256-QAM constellation.

23. The CATV digital QAM according to claim 18 wherein said modulating means further comprises:

first modulating means providing post filter carrier offset coupled to said first subfilter outputs; and second modulating means providing post filter carrier offset coupled to said second subfilter outputs.

24. The CATV digital QAM according to claim 23 wherein said first modulating means further comprises:

a plurality of mixers corresponding to each of said first subfilters, each mixer having a first and second input and an output; and a plurality of cosine generators corresponding to said number of said first subfilters, each having an output coupled to said respective mixers of said first subfilters;

said second modulating means further comprises:

a plurality of mixers corresponding to each of said second subfilters, each mixer having a first and second input and an output; and a plurality of sine generators corresponding to said number of said second subfilters, each having an output coupled to said respective mixers of said second subfilters.

* * * * *

UNITED STATES PATENT AND TRADEMARK OFFICE
CERTIFICATE OF CORRECTION

PATENT NO : 6,141,387
DATED : October 31, 2000
INVENTOR(S) : Qin Zhang

It is certified that error appears in the above-identified patent and that said Letters Patent are hereby corrected as shown below:

At column 1, line 45, after the word "in-phase", delete "$(y_r(nT))$" and insert therefor --$(y_r(nT'))$--.

At column 1, line 45, after the word "quadrature", delete "$(jy_i(nT))$" and insert therefor --$(jy_i(nT'))$--.

Figure 6A:
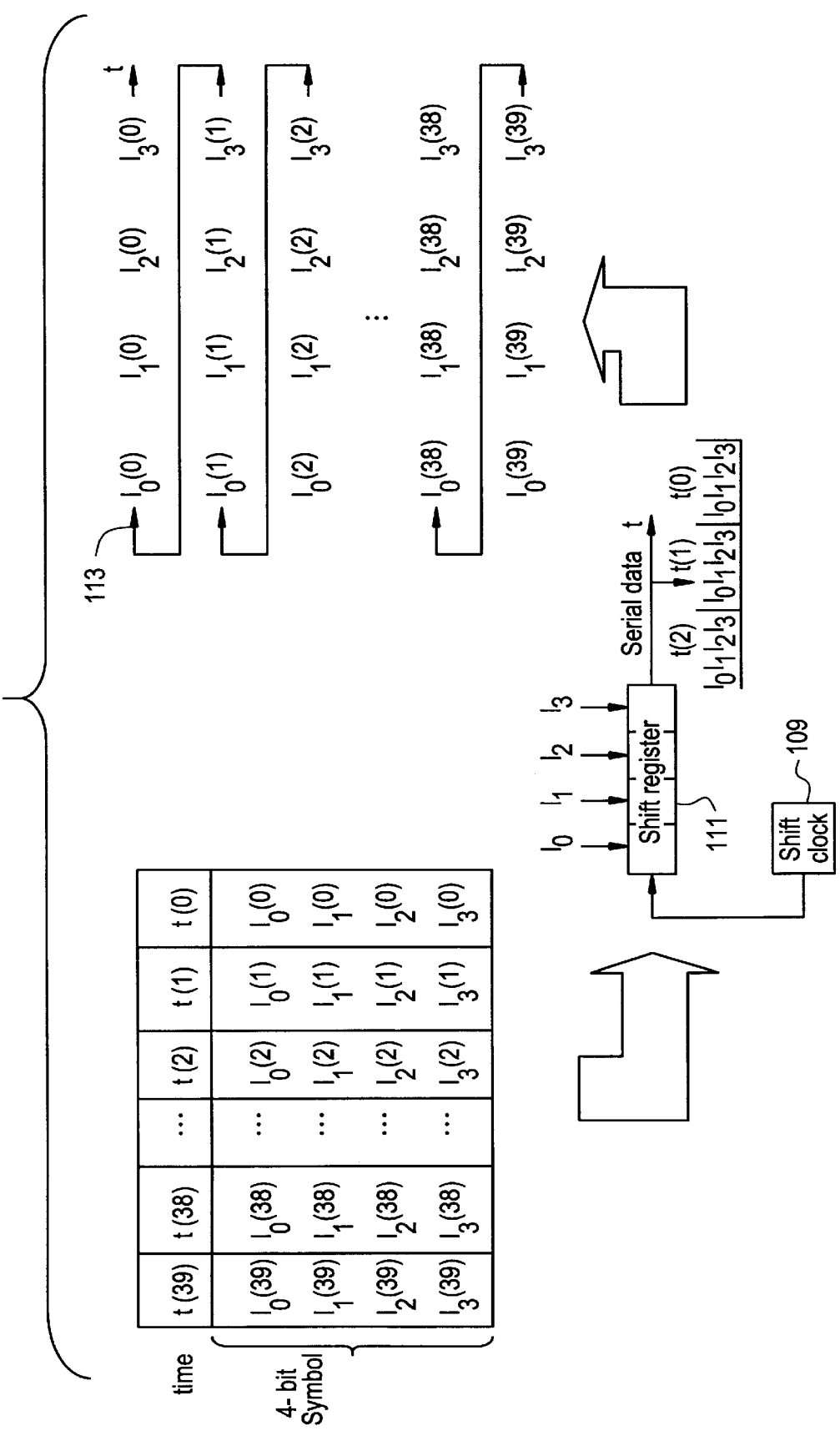
FIG. 6 is a diagram showing a subfilter shifting operation and look-up table assignment.
Figure 6B:
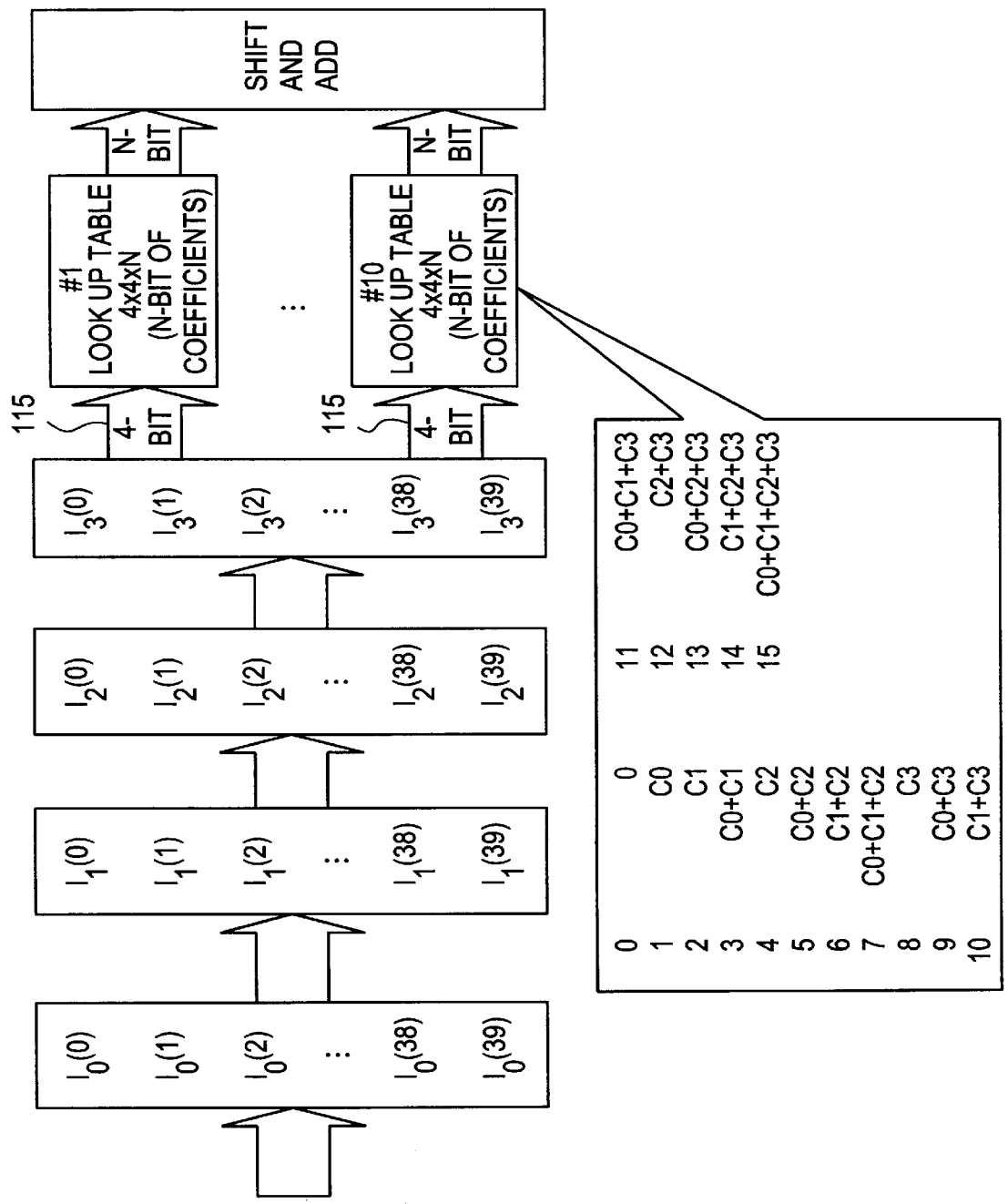

At column 2, line 52, delete "FIG. 6 is a diagram" and insert therefor --FIGS. 6A and 6B are diagrams--.

At column 3, line 5, after the word "output", insert --51--.

At column 4, line 51, delete "96 and outputting" and insert therefor --97 and output--.

At column 5, line 11, delete "FIG. 6" and insert therefor --FIGS. 6A and 6B--.

At column 6, line 12, after the word "FIG", delete "8B" and insert therefor --6B--.

UNITED STATES PATENT AND TRADEMARK OFFICE
CERTIFICATE OF CORRECTION

PATENT NO. : 6,141,387
DATED : October 31, 2000
INVENTOR(S) : Qin Zhang

It is certified that error appears in the above-identified patent and that said Letters Patent is hereby corrected as shown below:

At column 6, line 30, after the word "function", delete "109".

At column 6, line 30, delete "X/sine" and insert therefor --X/sin--.

Signed and Sealed this

First Day of May, 2001

Attest:

NICHOLAS P. GODICI

*Attesting Officer*   *Acting Director of the United States Patent and Trademark Office*